(12) United States Patent
Frauenfeld et al.

(10) Patent No.: US 9,016,192 B2
(45) Date of Patent: Apr. 28, 2015

(54) HOT-AND-COLD SERVING STATION

(75) Inventors: Victor M. Frauenfeld, Cleveland, WI (US); Peter Roever, West Bend, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 885 days.

(21) Appl. No.: 13/108,793

(22) Filed: May 16, 2011

(65) Prior Publication Data

US 2011/0277644 A1    Nov. 17, 2011

Related U.S. Application Data

(60) Provisional application No. 61/345,462, filed on May 17, 2010.

(51) Int. Cl.
| | |
|---|---|
| *A23L 1/00* | (2006.01) |
| *A47F 10/06* | (2006.01) |
| *A47J 36/24* | (2006.01) |
| *A47F 3/04* | (2006.01) |

(52) U.S. Cl.
CPC .............. *A47F 10/06* (2013.01); *A47F 3/0452* (2013.01); *A47J 36/2483* (2013.01)

(58) Field of Classification Search
CPC ..... A47F 10/06; A47F 3/0452; A47J 36/2483
USPC ............................ 99/483; 219/451.1; 62/258
See application file for complete search history.

(56) References Cited

U.S. PATENT DOCUMENTS

| | | | |
|---|---|---|---|
| 1,924,250 A * | 8/1933 | McGuire ........................ 137/60 |
| 2,182,682 A | 12/1939 | Shroyer | |
| 3,308,633 A | 3/1967 | Kritzler, Jr. | |
| 3,780,794 A | 12/1973 | Staub | |
| 3,785,163 A * | 1/1974 | Wagner ............................. 62/77 |
| 3,999,601 A | 12/1976 | Spanoudis | |
| 4,593,752 A * | 6/1986 | Tipton ......................... 164/48.1 |
| 4,685,311 A | 8/1987 | Rastelli | |
| 4,802,340 A | 2/1989 | Johnson | |
| 4,856,579 A | 8/1989 | Wolfe | |
| 5,168,719 A | 12/1992 | Branz et al. | |
| 5,191,769 A | 3/1993 | Mangini et al. | |

(Continued)

FOREIGN PATENT DOCUMENTS

| | | |
|---|---|---|
| DE | 197 10 444 A1 | 3/1998 |
| DE | 2020060 12 714 U1 | 10/2006 |

(Continued)

OTHER PUBLICATIONS

Quick Switch Hot-Cold-Freeze Drop-Ins Specification Sheet, retrieved from url: http://lowtempind.com/specsheets/QuickSwitch.pdf , 2 pages.

*Primary Examiner* — Jianying Atkisson

(74) *Attorney, Agent, or Firm* — Foley & Lardner LLP

(57) ABSTRACT

A serving station includes a first well and a second well. The wells configured for receiving food pans. The serving station further includes an active cooling system and an active heating system. The active cooling system is configured to independently lower the temperature of either or both of the first and second wells, and the active heating system is configured to independently raise the temperature of either or both of the first and second wells. Both wells may be heated, both wells may be cooled, or one of the first and second wells may be heated while the other is cooled.

16 Claims, 18 Drawing Sheets

(56) References Cited

U.S. PATENT DOCUMENTS

| | | | |
|---|---|---|---|
| 5,247,807 | A | 9/1993 | Jarman et al. |
| 5,282,367 | A | 2/1994 | Moore et al. |
| 5,355,687 | A | 10/1994 | Carpenter et al. |
| 5,363,672 | A | 11/1994 | Moore et al. |
| 5,388,429 | A | 2/1995 | Shackelford et al. |
| 5,512,733 | A | 4/1996 | Takikawa et al. |
| 5,921,096 | A | 7/1999 | Warren |
| 5,941,077 | A | 8/1999 | Safyan |
| 5,961,866 | A | 10/1999 | Hansen |
| 6,109,051 | A | 8/2000 | Majordy |
| 6,145,333 | A | 11/2000 | Richmond et al. |
| 6,151,905 | A | 11/2000 | Smith |
| 6,202,432 | B1 | 3/2001 | Haasis |
| 6,363,886 | B1 * | 4/2002 | Statton .................. 119/51.5 |
| 6,385,990 | B1 * | 5/2002 | Lee .......................... 62/407 |
| 6,434,961 | B2 | 8/2002 | Richmond et al. |
| 6,467,294 | B1 | 10/2002 | Walker et al. |
| 6,612,124 | B1 | 9/2003 | Hatch et al. |
| 6,735,958 | B2 | 5/2004 | Baumann |
| 6,735,971 | B2 | 5/2004 | Monroe et al. |
| 6,774,346 | B2 | 8/2004 | Clothier |
| 6,910,347 | B2 | 6/2005 | Monroe et al. |
| 7,028,498 | B2 | 4/2006 | Monroe et al. |
| 7,069,732 | B2 | 7/2006 | Walker et al. |
| 7,216,500 | B2 | 5/2007 | Schwichtenberg et al. |
| 7,243,506 | B2 | 7/2007 | Spillner |
| 8,307,761 | B1 | 11/2012 | Shackelford |
| 8,661,970 | B2 | 3/2014 | Shackelford |
| 2007/0210055 | A1 | 9/2007 | Konrad et al. |
| 2008/0023462 | A1 | 1/2008 | Shei et al. |
| 2008/0053111 | A1 | 3/2008 | Walker et al. |
| 2009/0013707 | A1 | 1/2009 | Spillner |
| 2010/0293979 | A1 | 11/2010 | Shei et al. |

FOREIGN PATENT DOCUMENTS

| | | |
|---|---|---|
| EP | 1 475 583 A1 | 11/2004 |
| EP | 1 796 509 A1 | 8/2008 |
| FR | 2604882 A1 | 4/1988 |
| FR | 2671950 A1 | 7/1992 |
| GB | 0 986 401 | 3/1965 |
| GB | 2 301 173 A | 11/1996 |
| WO | WO-00/71950 A1 | 1/2000 |
| WO | WO-2006/054467 A1 | 5/2006 |
| WO | WO-2007/063294 A2 | 6/2007 |
| WO | WO-2007/097578 A1 | 8/2007 |

* cited by examiner

HOT-AND-COLD SERVING STATION

CROSS-REFERENCE TO RELATED PATENT APPLICATIONS

This application claims the benefit of U.S. Provisional Application No. 61/345,462, filed May 17, 2010, which is incorporated herein by reference in its entirety.

BACKGROUND

The present disclosure relates generally to the field of food service equipment. More specifically the present disclosure relates to a serving station having heated and/or cooled wells for controlling the temperature of food items stored in food pans resting in the wells.

SUMMARY

One embodiment of the invention relates to a serving station that includes a first well and a second well. The wells configured for receiving food pans. The serving station further includes an active cooling system and an active heating system. The active cooling system is configured to independently lower the temperature of either or both of the first and second wells, and the active heating system is configured to independently raise the temperature of either or both of the first and second wells. Both wells may be heated, both wells may be cooled, or one of the first and second wells may be heated while the other is cooled.

Another embodiment of the invention relates to a serving station that includes a well configured for receiving a food pan, an active heating system, an active cooling system, and a drain system. The heating system includes a heating element configured to operate at least partially submerged in water so that steam from the water heats the food pan and thereby raises the temperature of the well. The active cooling system is configured to lower the temperature of the well such that the well may be heated or cooled. The drain system is coupled to the well. When the cooling system is activated, the drain system automatically releases valves, which allow for the water of the heating system to drain from the well if the heating system was operated prior to activation of the cooling system.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
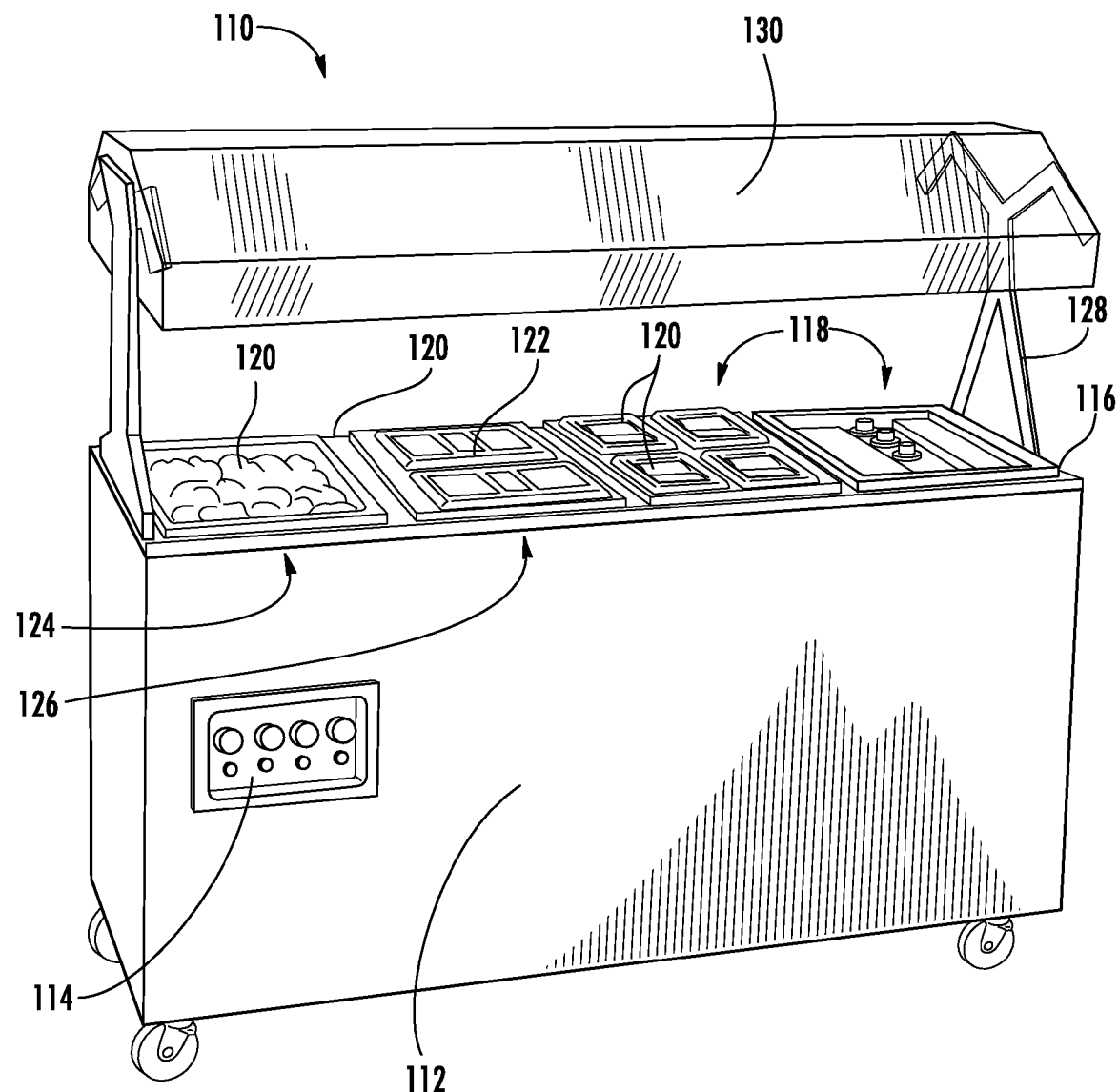
FIG. 1 is a perspective view of a serving station according to an exemplary embodiment of the invention.

Referring to FIG. 1, a serving station 110 (e.g., serving equipment, drop-in unit) includes a base 112, a control interface 114, and a work surface 116. Wells 118 are formed in the work surface 116 within which food pans 120 may rest. As shown in FIG. 1, an assortment of food pans 120 of different shapes and sizes with different food contents 122 may be supported by the wells 118 of the work surface 116. Proximate to the food pans 120 and coupled to the wells 118, a fluid (e.g., water, air, etc.) may be heated and/or cooled to influence the temperature of the food contents 122 stored in the food pans 120, via heat transfer through and around the food pans 120.

Figure 3:
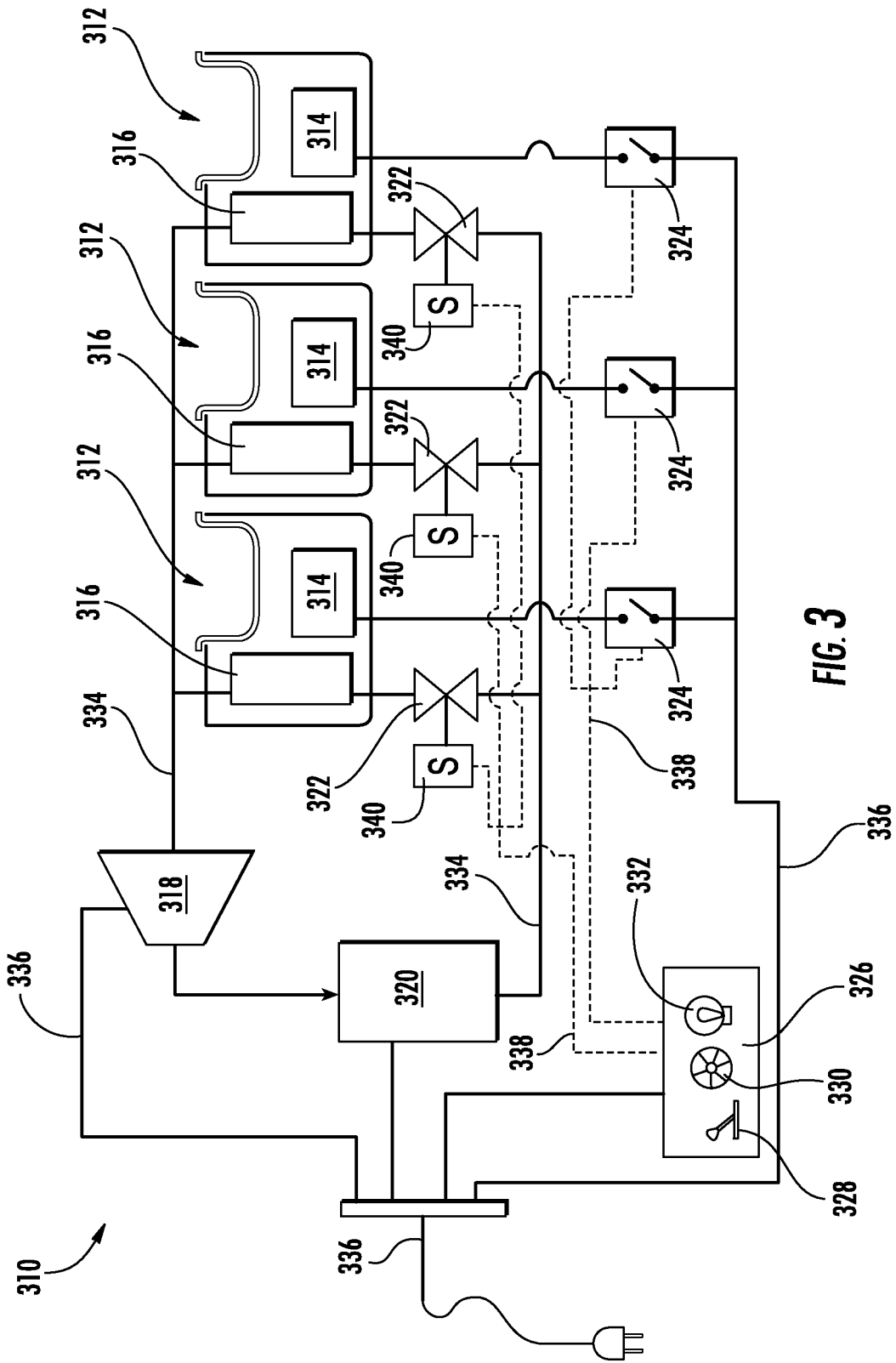
FIG. 3 is a schematic diagram of a serving station according to another exemplary embodiment of the invention.

According to an exemplary embodiment, the control interface 114 communicates with working elements housed in the base 112. In some embodiments, the working elements include a cooling system (e.g., cooling equipment, refrigeration equipment). The cooling system may include a compressor, a condenser, a throttle valve, and an evaporator (see, e.g., compressor 318, condenser 320, valve 322, and evaporator 316 as shown in FIG. 3). The evaporator may be coupled to the work surface 116, such as integrated with the structure of one of the wells 118. In other embodiments, the cooling system of the serving station 110 includes one or more of a broad range of commercially-available systems for removing heat (e.g., pumping heat) from a body or medium to lower the temperature thereof.

Figure 20:
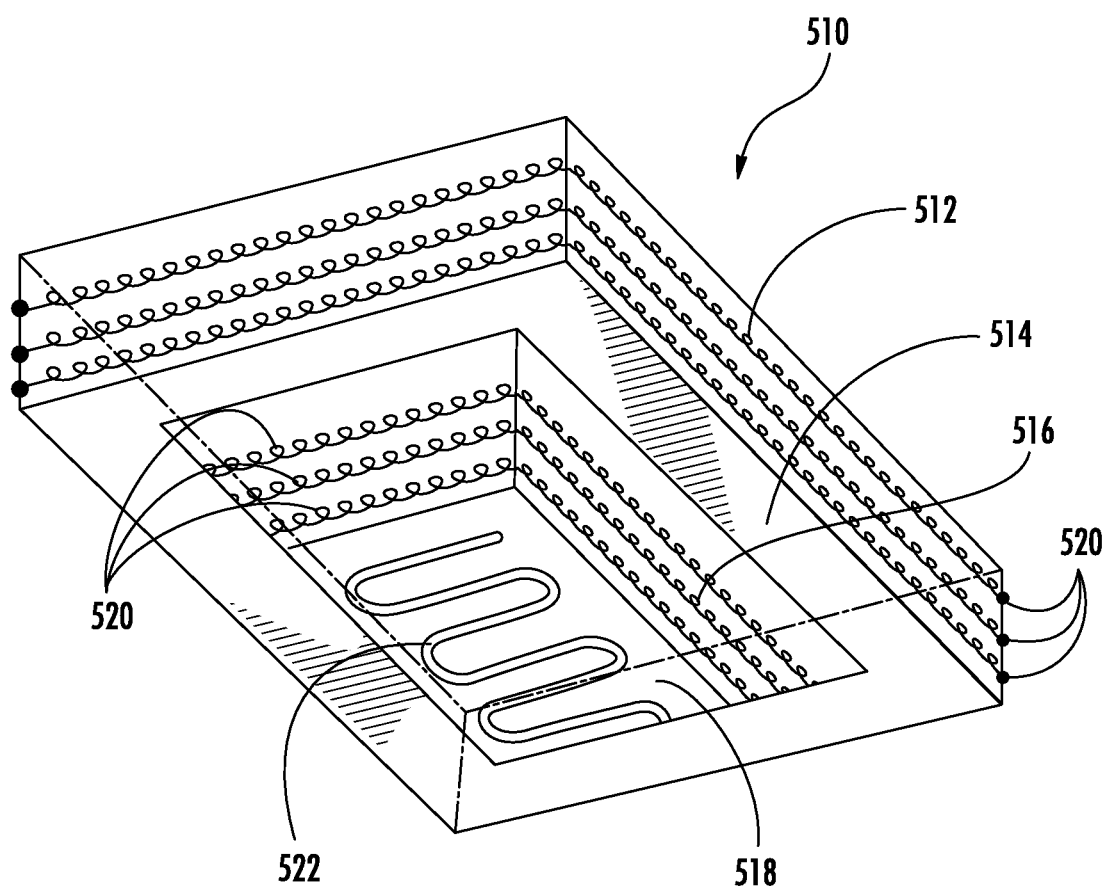
FIG. 20 is a perspective view of a well of a serving station according to an exemplary embodiment of the invention.
Figure 21:
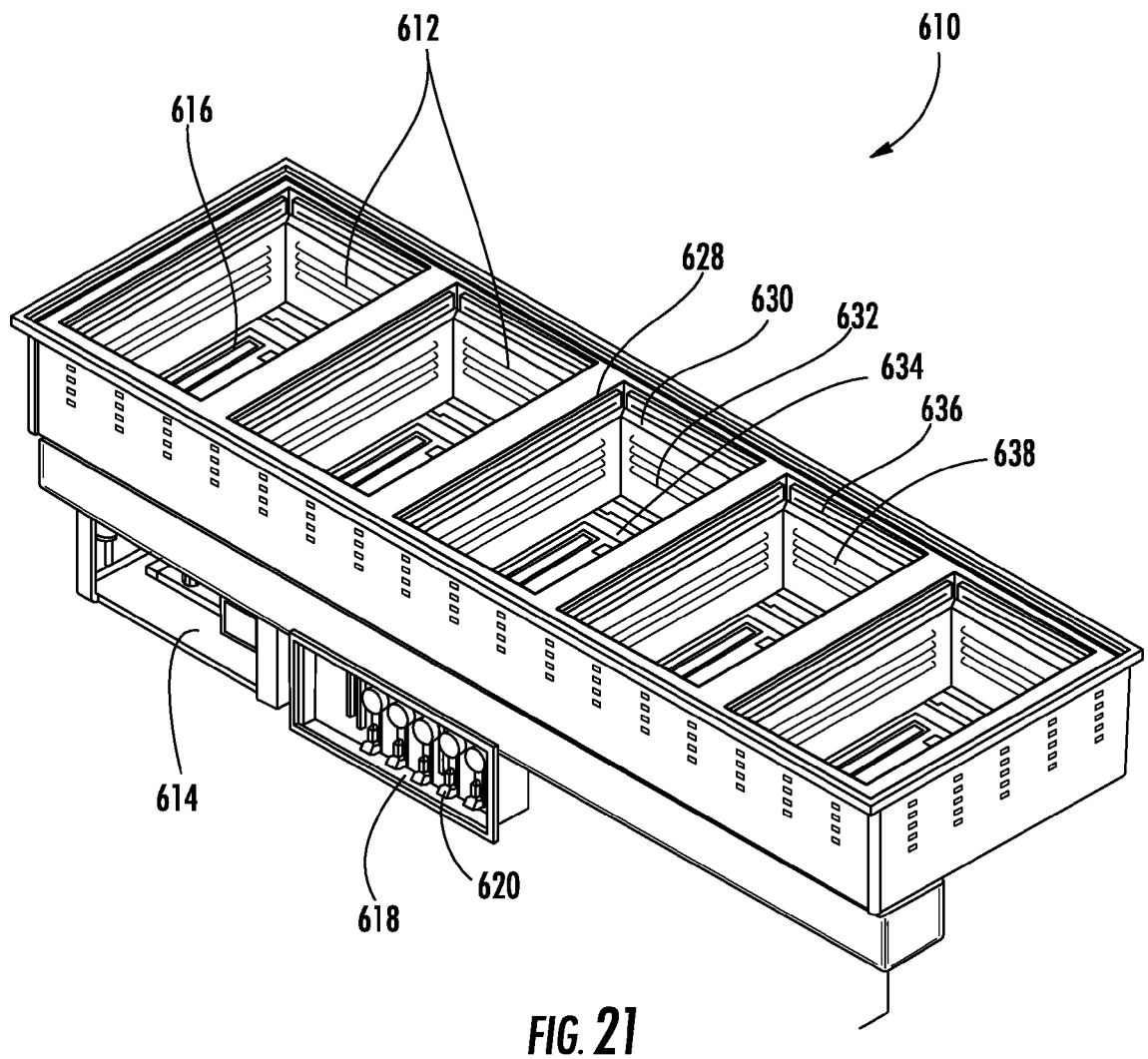
FIG. 21 is a perspective view of a food station according to an exemplary embodiment.
Figure 22:
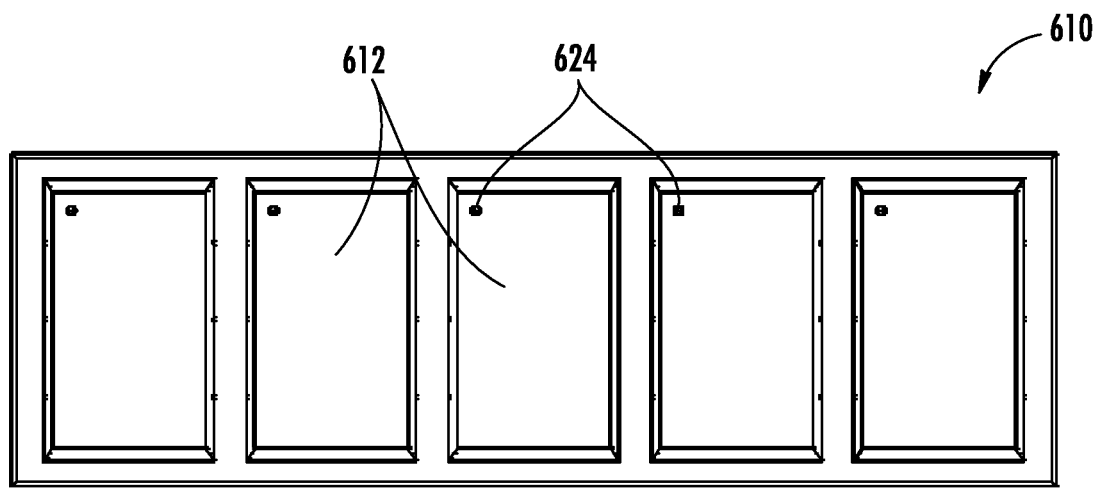
FIG. 22 is a top view of the food station of FIG. 21.
Figure 23:
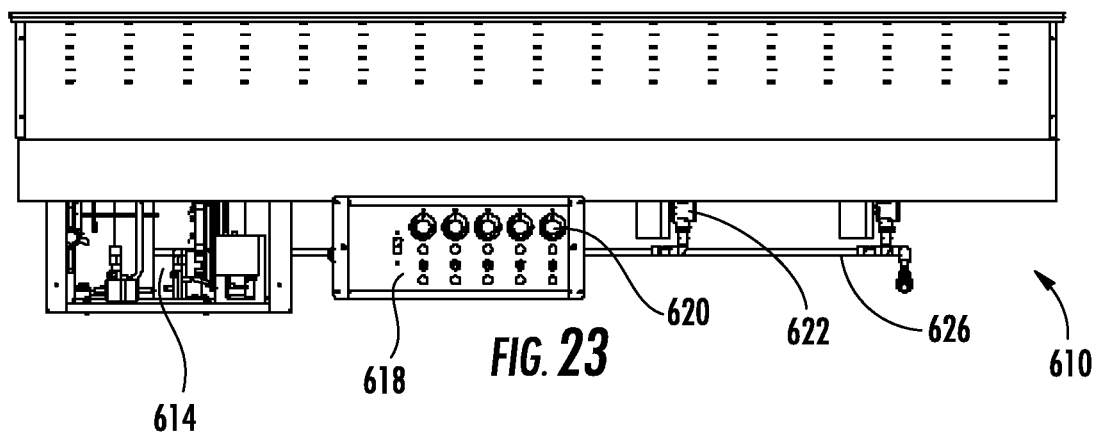
FIG. 23 is a side view of the food station of FIG. 21.
Figure 24:
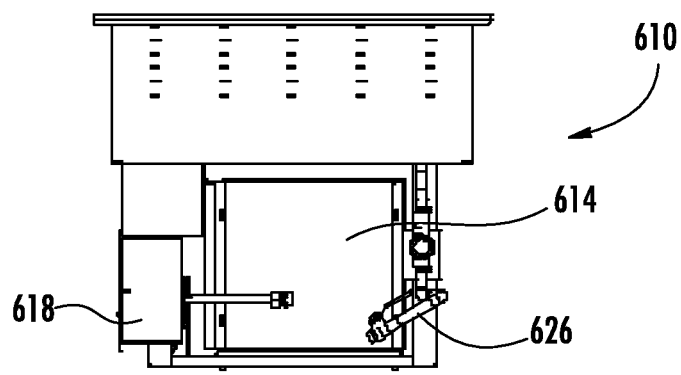
FIG. 24 is an end view of the food station of FIG. 21.

In some such embodiments, the working elements housed in the base 112 further include a heating system (e.g., heater, heating equipment). The heating system may include an electric-resistance heating element (see, e.g., heating element 522 as shown in FIG. 20). In other embodiments, the heating system includes an electric-induction heating element. In still other embodiments, the heating system includes one or more of a broad range of commercially-available systems for adding heat (e.g., pumping heat) to or into a body or medium to raise the temperature thereof.

According to a preferred embodiment, one or more wells 118 (e.g., two, four, all, etc.) of the serving station 110 include a combination of both the cooling and heating systems, such that the wells 118 are independently configured to both raise or lower the temperature of food pans 120 resting in the wells 118. In such an embodiment, one 124 of the wells 118 of the serving station 110 may be heated by the heating system while another 126 of the wells 118 may be cooled by the cooling system. The heated well 124 and the cooled well 126 may be adjacent to each other in the serving station 110. The wells 124, 126 may be either hot or cold, in any combination, at any time. In other embodiments, some wells 118 include only a heating element while other wells include only refrigeration equipment.

In some embodiments, additional structure 128 (e.g., posts, brackets, cross-members, etc.) may be coupled to the base 112 to support a guard 130 (e.g., sneeze guard, breath guard) that shields the food contents 122 stored in the food pans 120. Further, the additional structure 128 may support lighting, heat lamps, or other features associated with the serving station 110. In some embodiments, a serving station may be of a wider or narrower width, a longer or shorter length, and/or a taller or shorter height when compared to the serving station 110 shown in FIG. 1. The shape and contour of the base 112, work surface 116, and additional structure 128 may vary in different contemplated embodiments. Further, the control interface 114 may be otherwise arranged, as shown in another exemplary embodiment of FIG. 2, for example.

Figure 2:
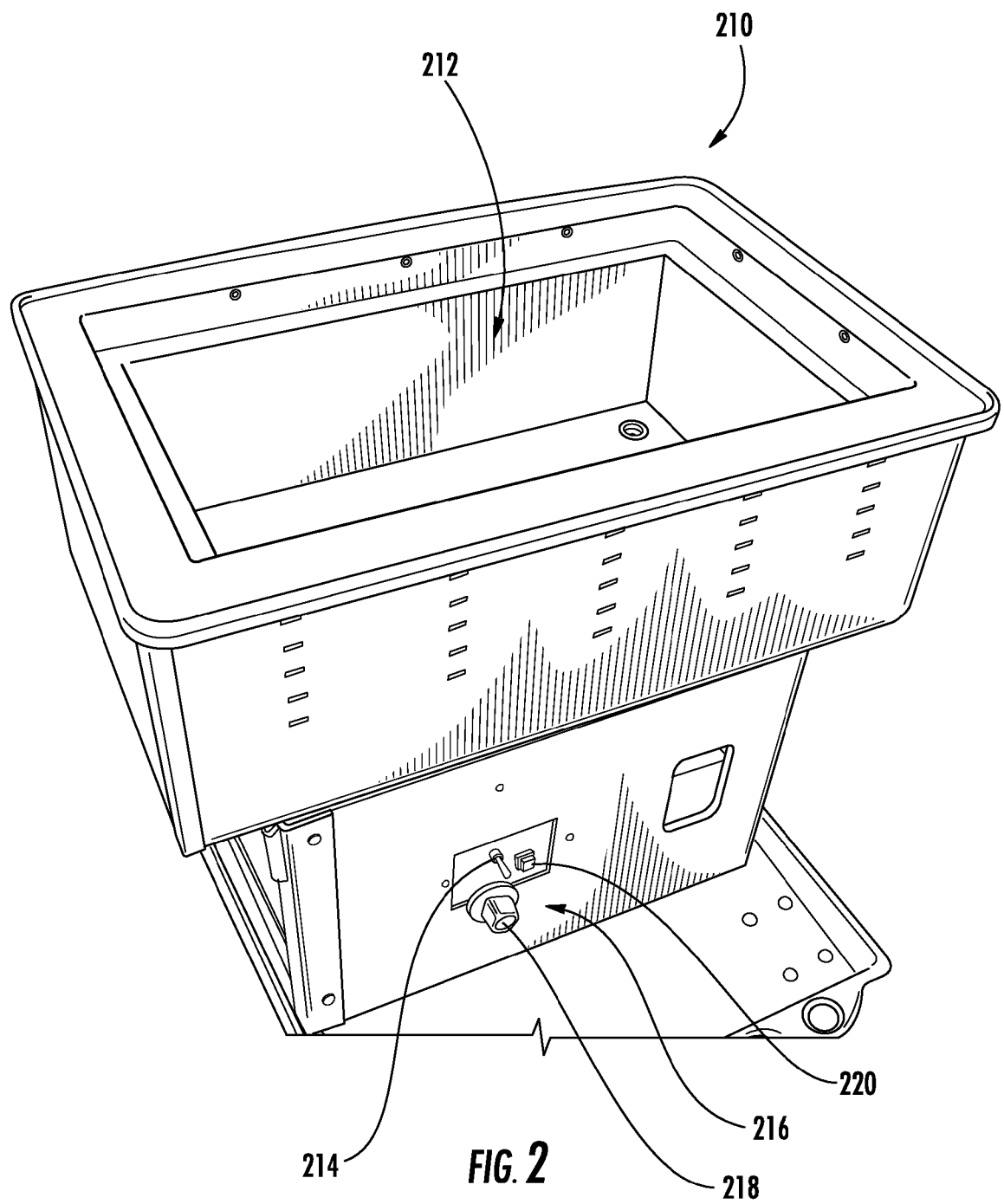
FIG. 2 is a perspective view of a serving station according to another exemplary embodiment of the invention.
Figure 12:
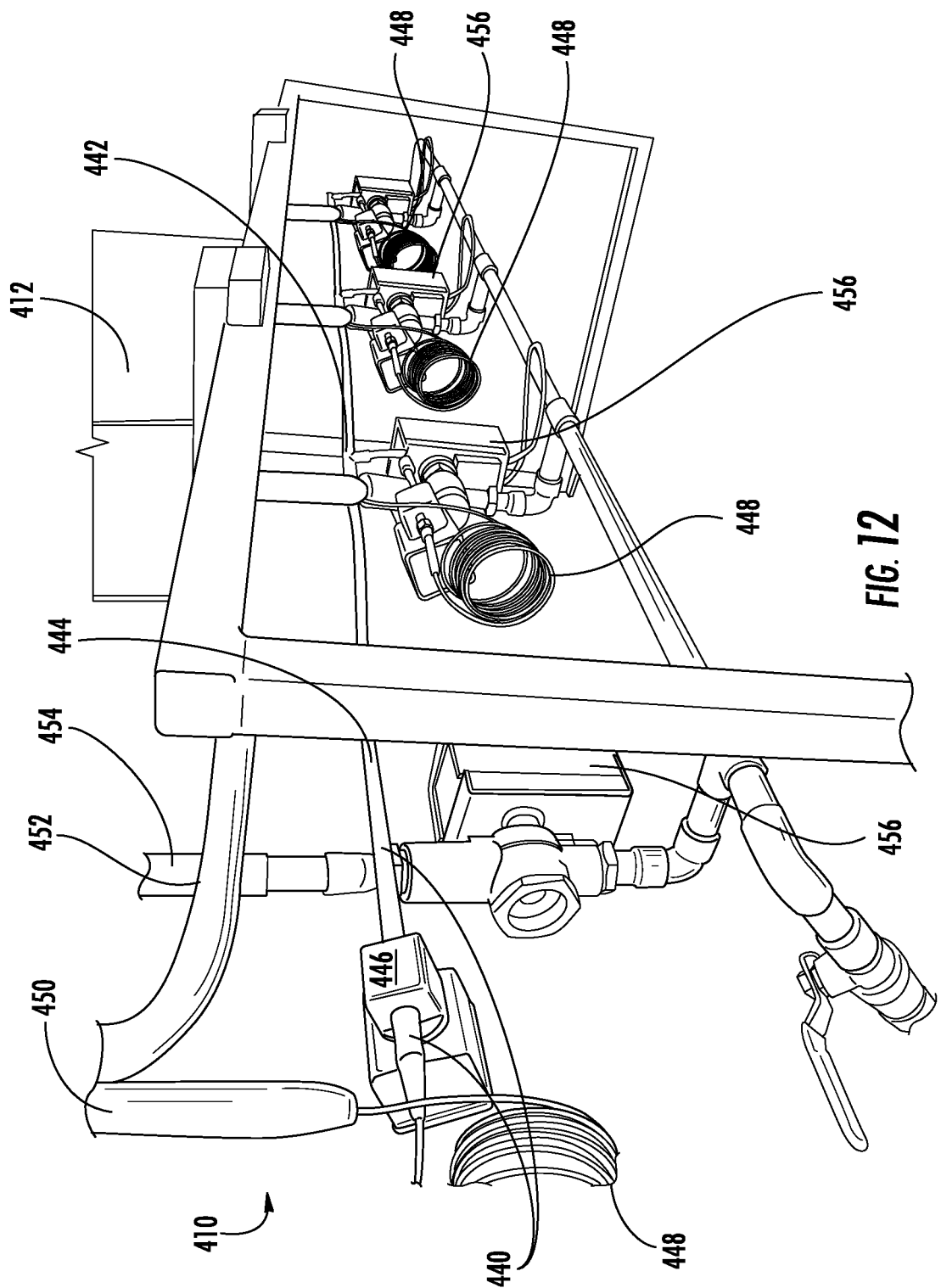
Figure 13:
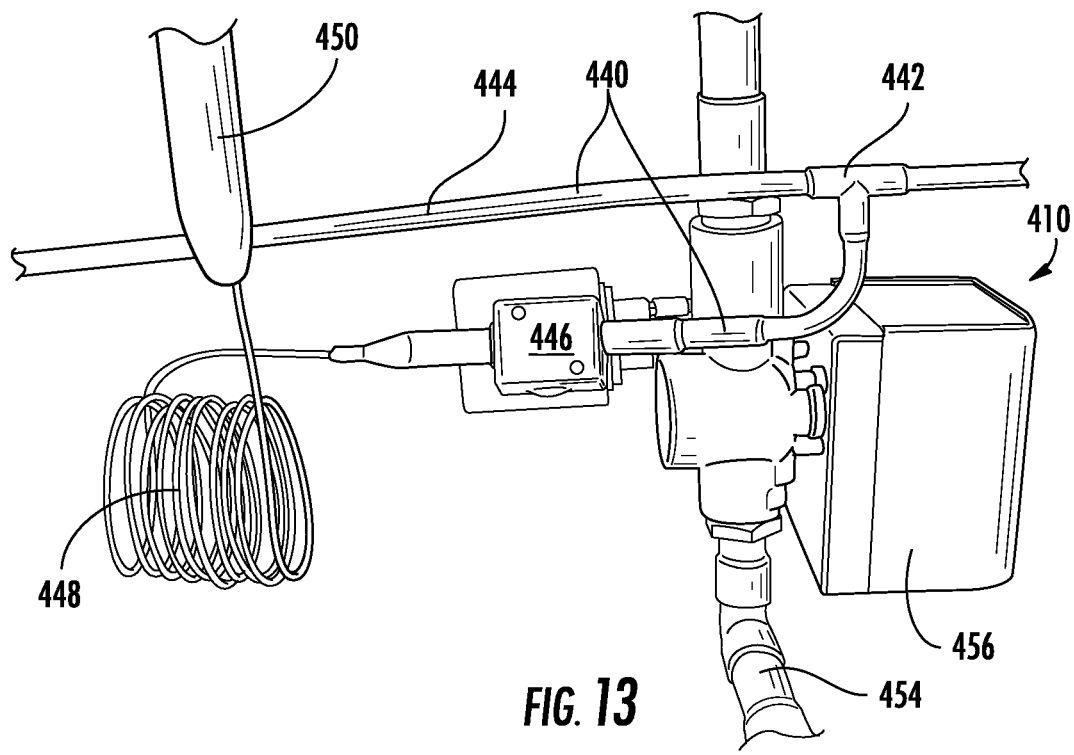
Figure 14:
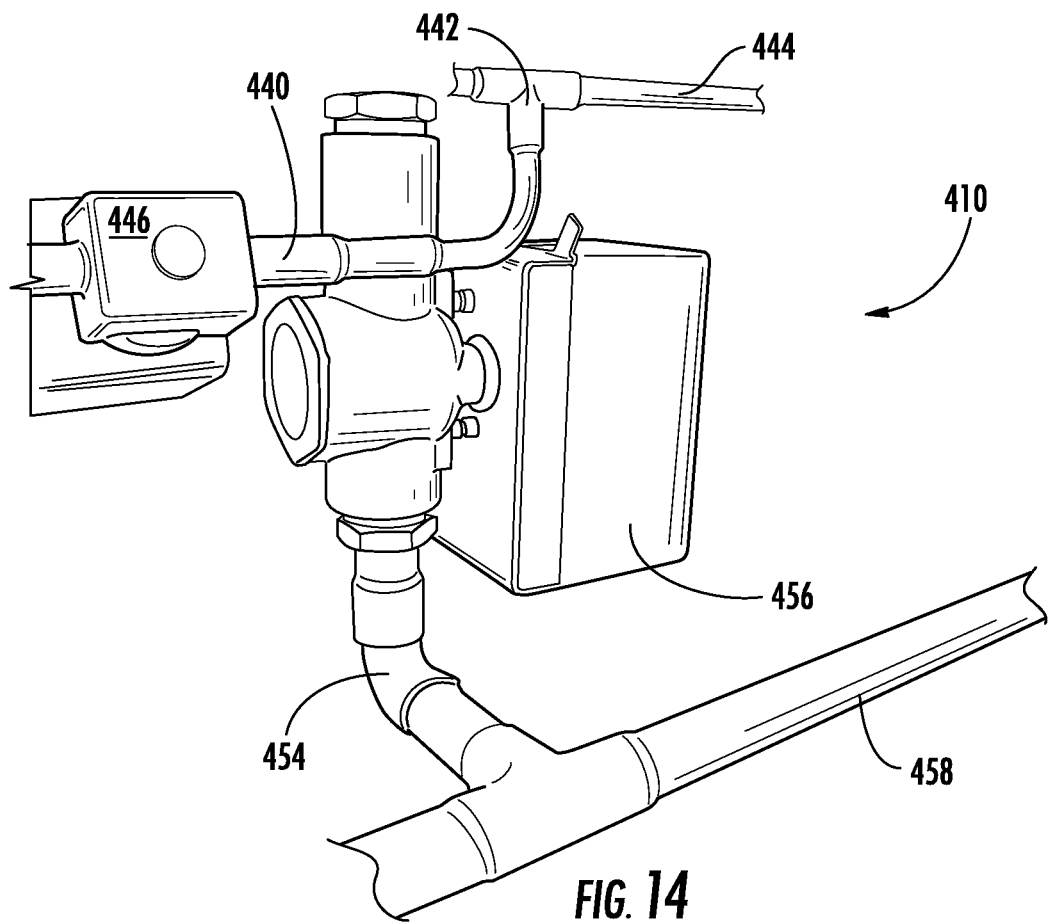
Figure 15:
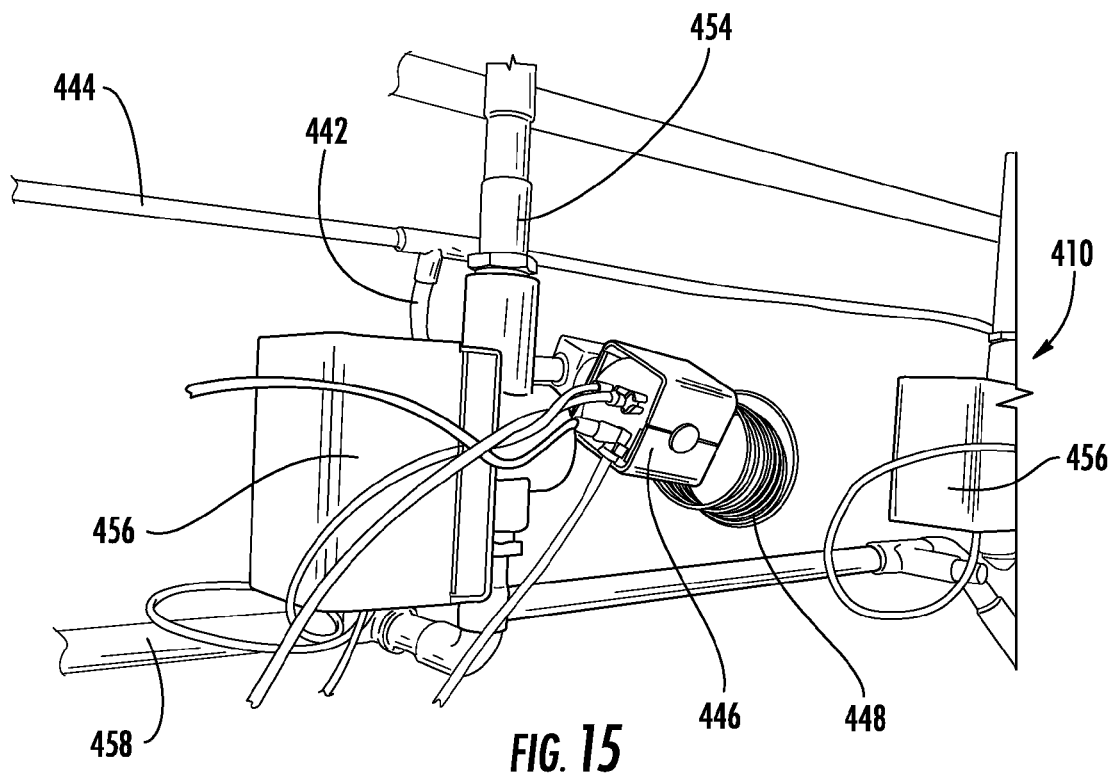
Figure 16:
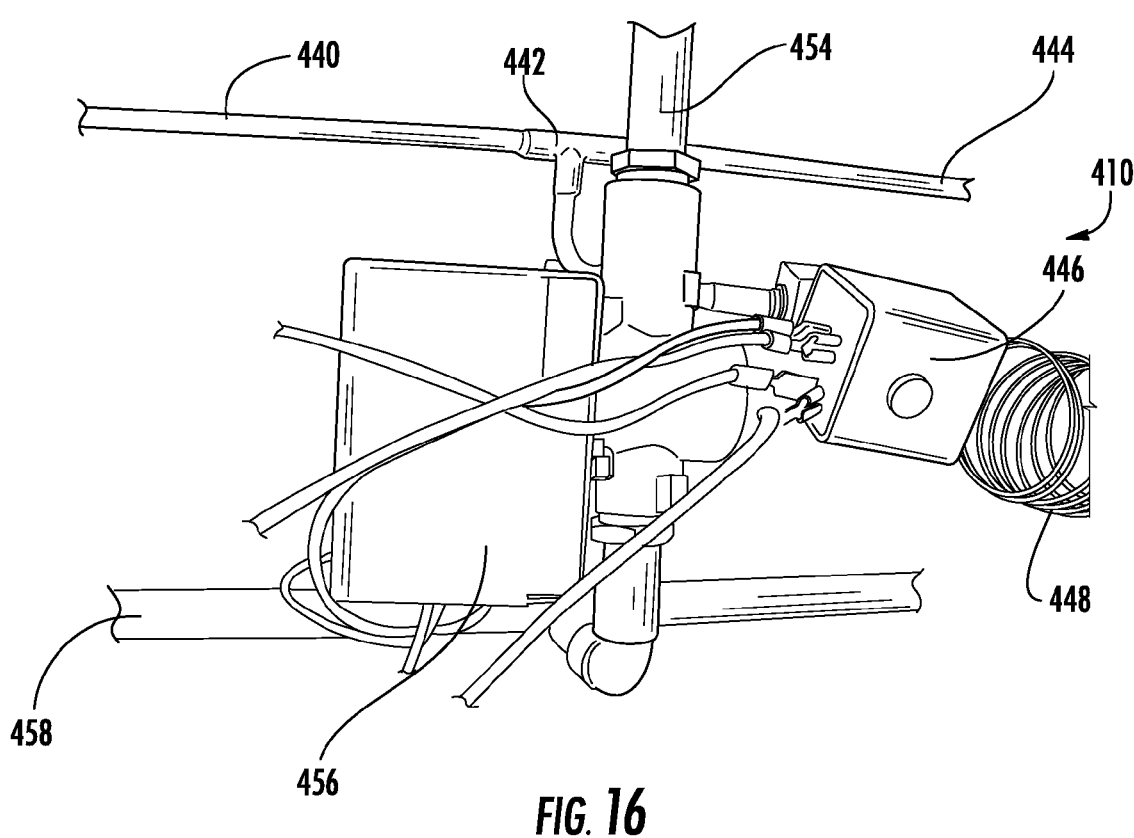
Figure 17:
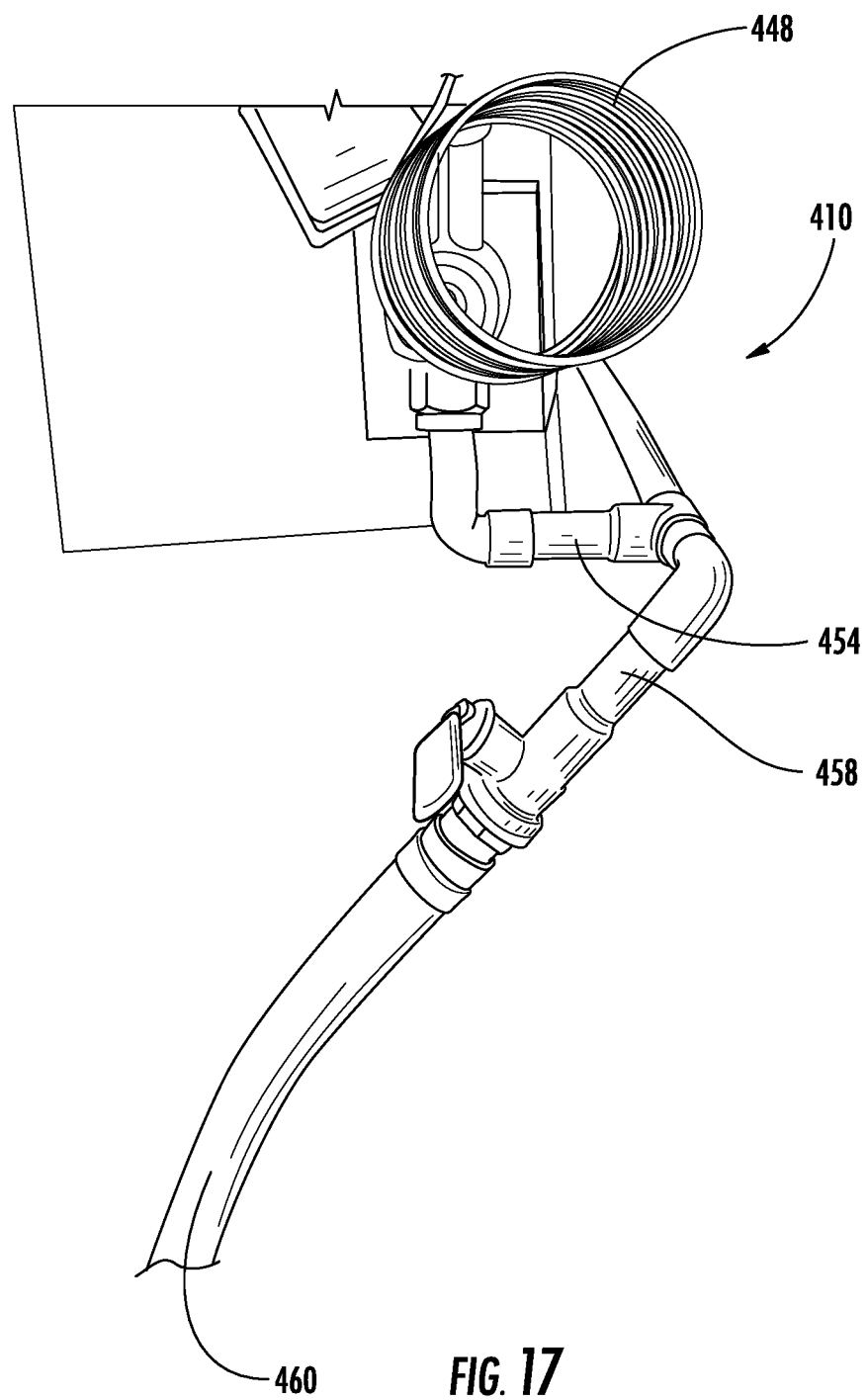
Figure 18:
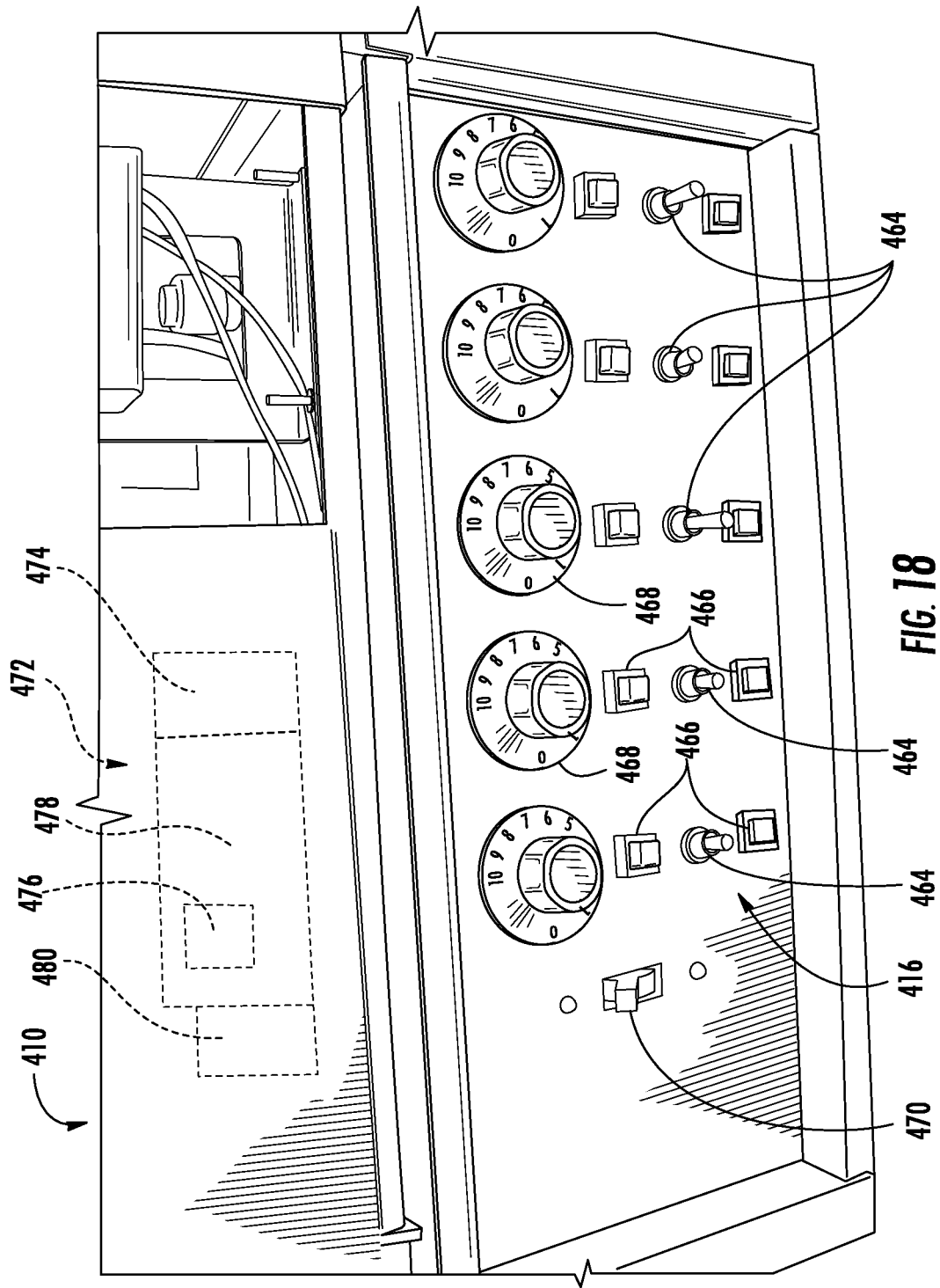
FIG. 18 is a perspective view of a control interface associated with the serving station of FIG. 4.

Referring now to FIG. 2, a combination hot/cold drop-in unit 210 includes a single food well 212. The well 212 may be independently controlled to keep warm food warm and cold food cold. To do so, the well 212 is controllable by a switch 214 (see also toggle 464 as shown in FIG. 18) that will either turn on a heater to heat the well 212, or start a refrigeration system to cool the well 212. According to an exemplary embodiment, the refrigeration system utilizes a compressor (see, e.g., compressor 318 as shown in FIG. 3) that provides refrigerant to the well 212 (e.g., via plumbing 440 with controllable valves 446 as shown in FIG. 12).

The well 212 has temperature controls 216. In some embodiments, the controls 216 are contained within the unit 210 (e.g., on an exterior face thereof), while in other embodiments, the controls 216 are positioned at a remote location, separate from the unit 210. In some embodiments, the controls 216 enable a user to turn the heater on or off, and/or to turn the refrigeration system on or off. In some such embodiments, the controls further include a thermostat interface 218 (e.g., dial, push button panel, toggle) associated with the heater, to adjust the rate of heating supplied by the heater for the well 212. In other such embodiments, the controls 216 include a similar thermostat and interface associated with the refrigeration system. In still other such embodiments, the controls 216 include one or more thermostats operable to control both the heater and refrigeration system. Indicator lights 220, toggle position, displays, or other machine-to-human indicia may facilitate the transfer of information and commands between the unit 210 and an operator thereof. In other embodiments, a serving station may include multiple wells, similar to well 212, where each well includes an individual temperature control. However in such an embodiment, the wells may share common components, such as a common compressor for the cooling system.

Referring now to FIG. 3, a hot/cold unit 310 includes a plurality of hot/cold modules 312. Each hot/cold module 312 includes a heating system and a cooling system. According to an exemplary embodiment, the heating system includes an heating element 314 (e.g., heating coil) and the cooling system includes an evaporator 316. The cooling system further includes a compressor 318, a condenser 320, and valves 322 (e.g., controlled by solenoids 340) associated with each evaporator 316. The heating system further includes a switch 324 associated with each heating element 314.

A controller 326 is in communication with each of the valves 322 and switches 324. According to an exemplary embodiment, the controller 326 is further coupled to a user interface, which may include a toggle 328, a dial 330, and/or an indicator light 332 (e.g., indicating on/off, heating/cooling, etc.) associated with each hot/cold module 312. According to an exemplary embodiment, components of the hot/cold unit 310 (e.g., heating elements 314, valves 322, compressor 318, condenser 320) may be powered by electricity, supplied by an outlet, battery, generator, etc. As such, the hot/cold unit 310 includes refrigerant plumbing 334, an electrical circuit 336, and a communication bus 338 (e.g., data bus, electrical signal circuit).

Referring to FIGS. 4-19, various components of a serving station 410 (see also serving station 110 and hot/cold drop-in unit 210 as shown in FIGS. 1-2) are shown from various perspectives, according to an exemplary embodiment. The components of the serving station 410 in FIGS. 4-19 are shown as separated or only partially assembled for purposes of discussing and identifying various components of the serving station 410.

Figure 4:
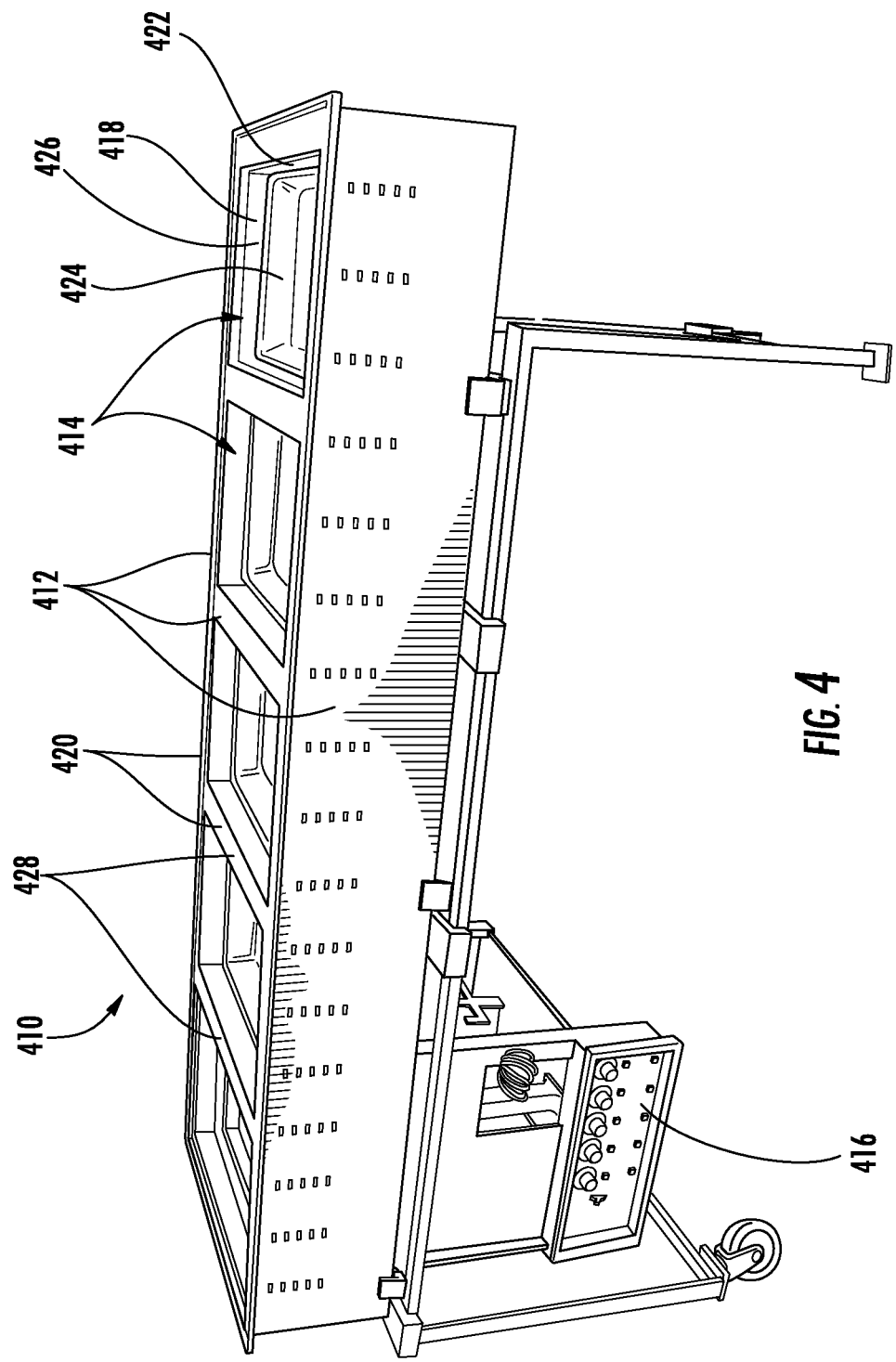
FIG. 4 is a perspective view of a work surface portion of a serving station according to yet another exemplary embodiment of the invention.
Figure 5:
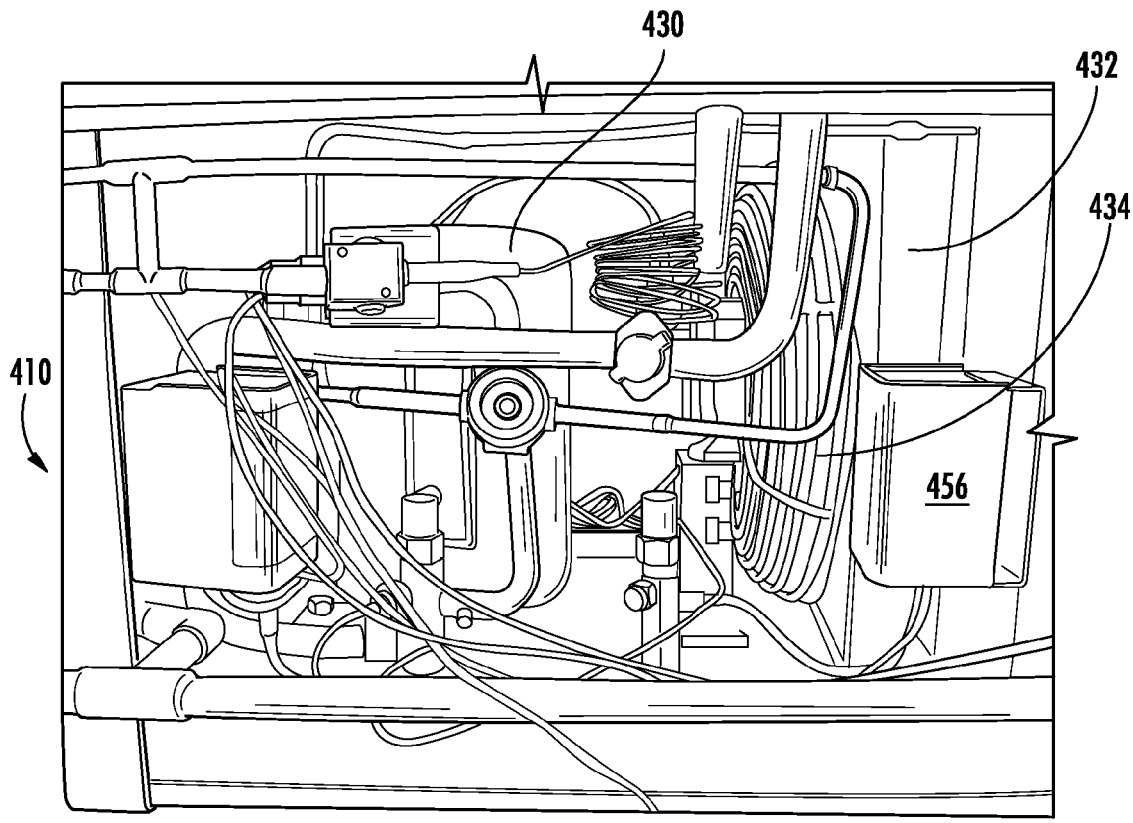
FIGS. 5-10 are perspective views of working elements of a cooling system associated the serving station of FIG. 4.
Figure 6:
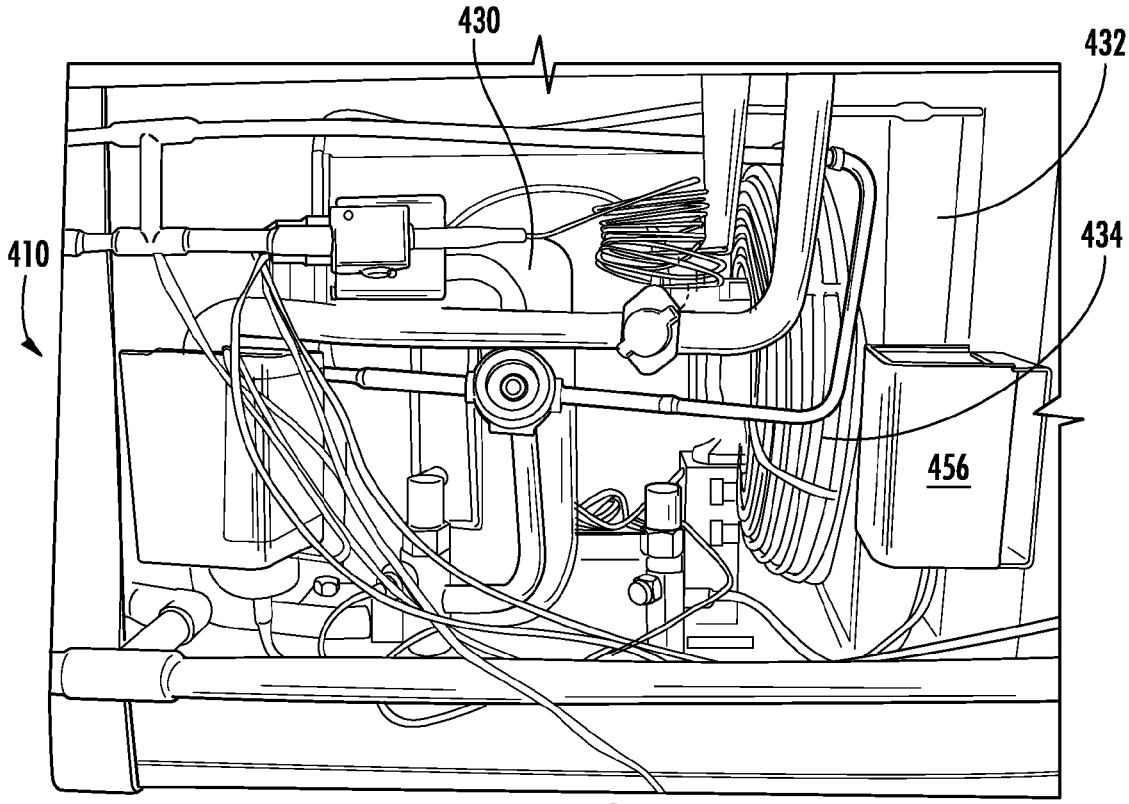
Figure 7:
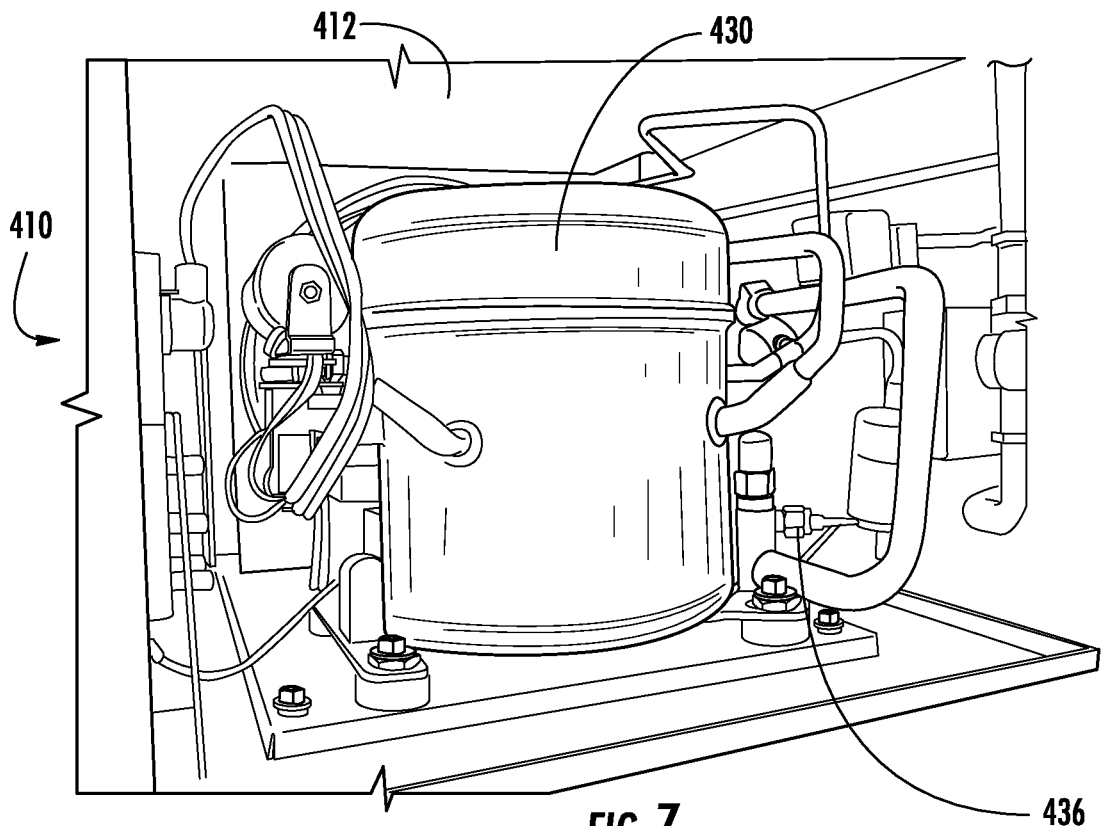
Figure 8:
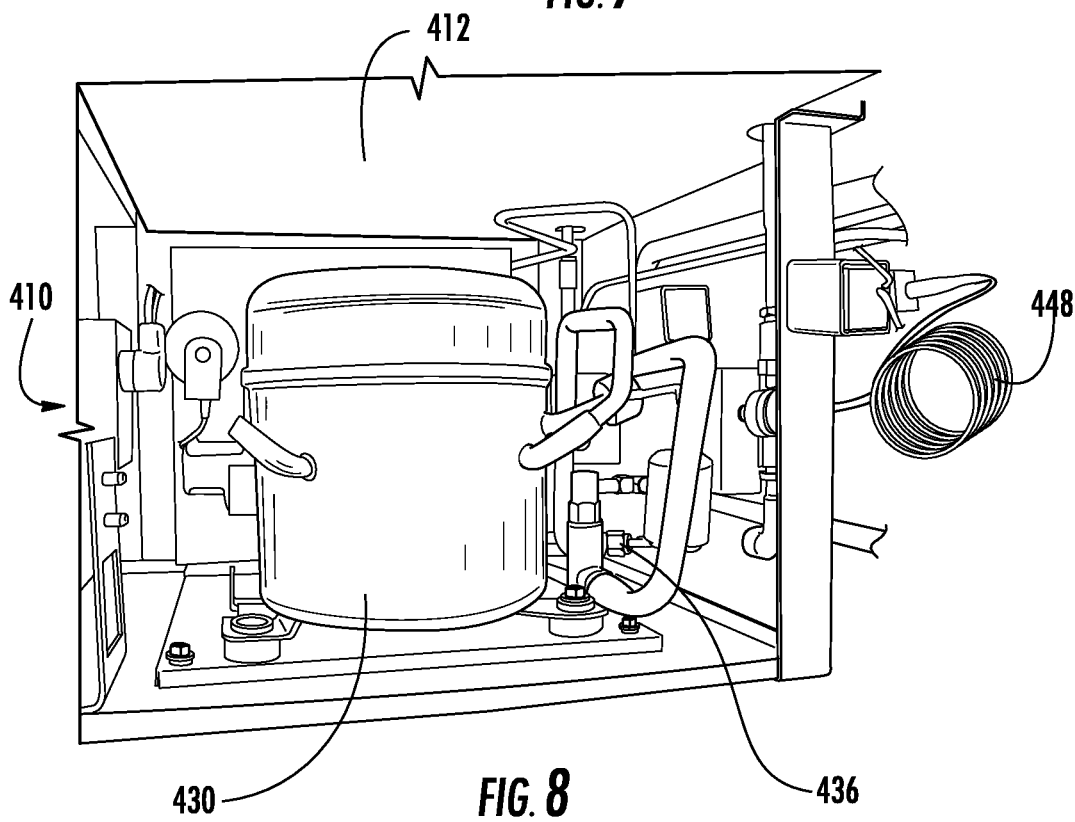

Referring specifically to FIG. 4, a work surface 412 (e.g., platform, countertop, etc.) of the serving station 410 includes wells 414 formed therein and a control interface 416 (see also FIG. 18) coupled thereto. Each well 414 includes a vertical side wall 418 extending downward from a top 420 of the work surface 412 (see also FIG. 20). The vertical side wall 418 connects to an inwardly-directed surface 422 (e.g., flange, ledge) upon which the underside of a rim 426 of a food pan 424 may be supported. Accordingly, the food pan 424 rests substantially within the well 414, and below at least a portion of the vertical side wall 418. In other embodiments, a work surface is arranged such that the rim of the food pan rests upon the top of the work surface, above side walls of the well.

Below each food pan 424, the corresponding well 414 includes a volume configured to store a fluid (e.g., water, air, etc.) for heating and/or cooling. In some such embodiments, the medium is water, which is stored and converted to steam to heat the underside of the respective food pan 424. The heated water is then drained from the well 414 when the food pan 424 is to be cooled. Each of the wells 414 is divided by an intermediate portion 428 of the work surface 412, and in some such embodiments each of the wells 414 is separated from others of the wells 414 by insulation media (e.g., fiberglass, open space, or other materials having low thermal conductivity) positioned in the intermediate portion 428 between the wells 414.

Referring to FIGS. 5-8, some working elements of a cooling system (e.g., heat exchanger, heat pump, etc.) for the serving station include a compressor 430 and a condenser 432. According to an exemplary embodiment, during operation of the compressor 430, refrigerant (e.g., R-134a refrigerant, R-404A) is compressed to a higher pressure and then provided to the condenser 432, where the refrigerant is condensed and cooled. In some embodiments, the refrigerant in the condenser 432 is cooled by a fan 434 (e.g., blower) passing air over a conduit or parallel series of conduits (not shown) in the condenser 432 through which the refrigerant flows. In other embodiments, the refrigerant is water cooled or otherwise cooled and condensed.

According to an exemplary embodiment, a pressure-sensitive member 436 (e.g., low-pressure switch, pressure sensor) is coupled to the compressor 430. In some such embodiments, the pressure-sensitive member 436 is coupled to the inlet of the compressor 430. When the cooling system of the serving station 410 is in use, the pressure-sensitive member 436 detects a change in pressure of the refrigerant and controls the compressor 430 (e.g., activates, adjusts the speed thereof) in response thereto. Horsepower of the compressor may vary as a function of the number wells in a given configuration, and in some embodiments may range from a quarter horsepower for a food station with one to two wells, a third horsepower for three wells, a half horsepower for four to five wells.

According to an exemplary embodiment, the speed of the compressor 430 is proportionally controlled as a function of the refrigerant pressure detected by the pressure-sensitive member 436. As such, when a larger demand is required by the cooling system, a correspondingly larger refrigerant pressure difference is detected, and the speed of the compressor 430 is increased to keep up with the demand, and vice versa. In other embodiments, other sensors (e.g., flow rate sensor) are used to monitor the state of the refrigerant proximate to the compressor 430, for control of the compressor 430. In still other embodiments, the speed of the compressor 430 is controlled by a control computer, without regard to the state of refrigerant proximate to the compressor 430.

Figure 9:
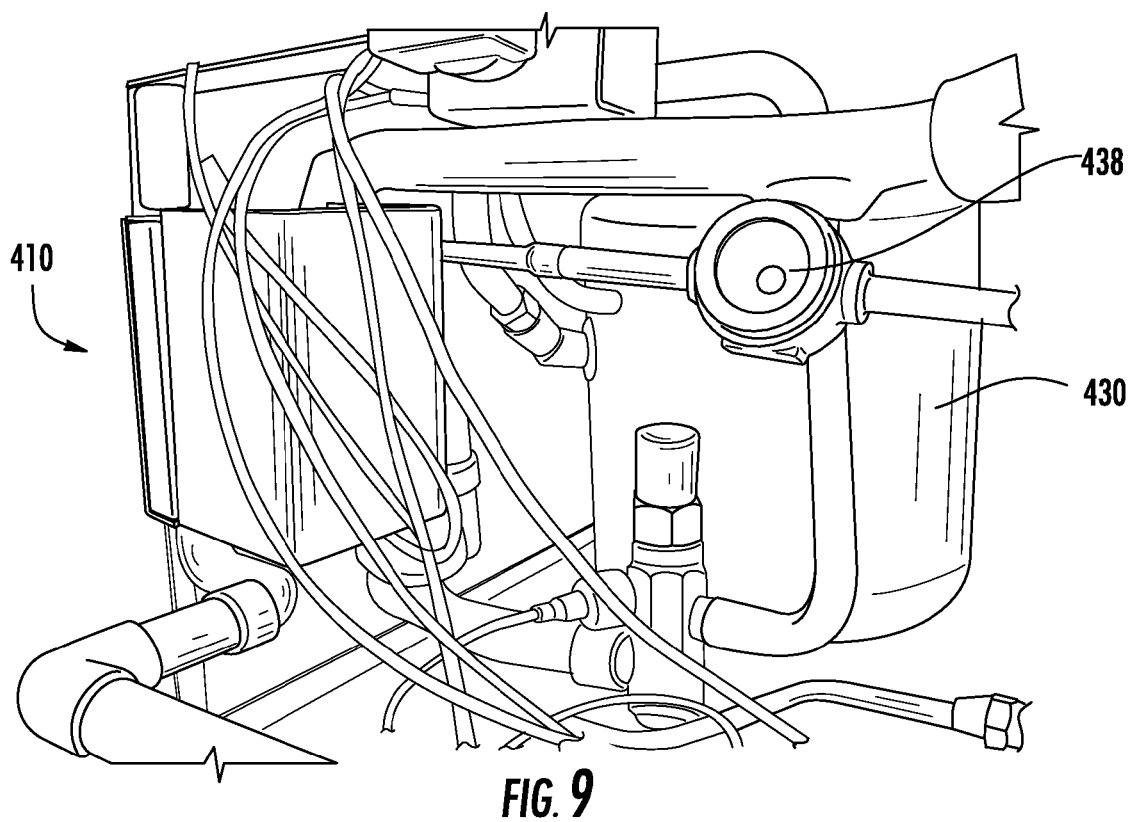
Figure 10:
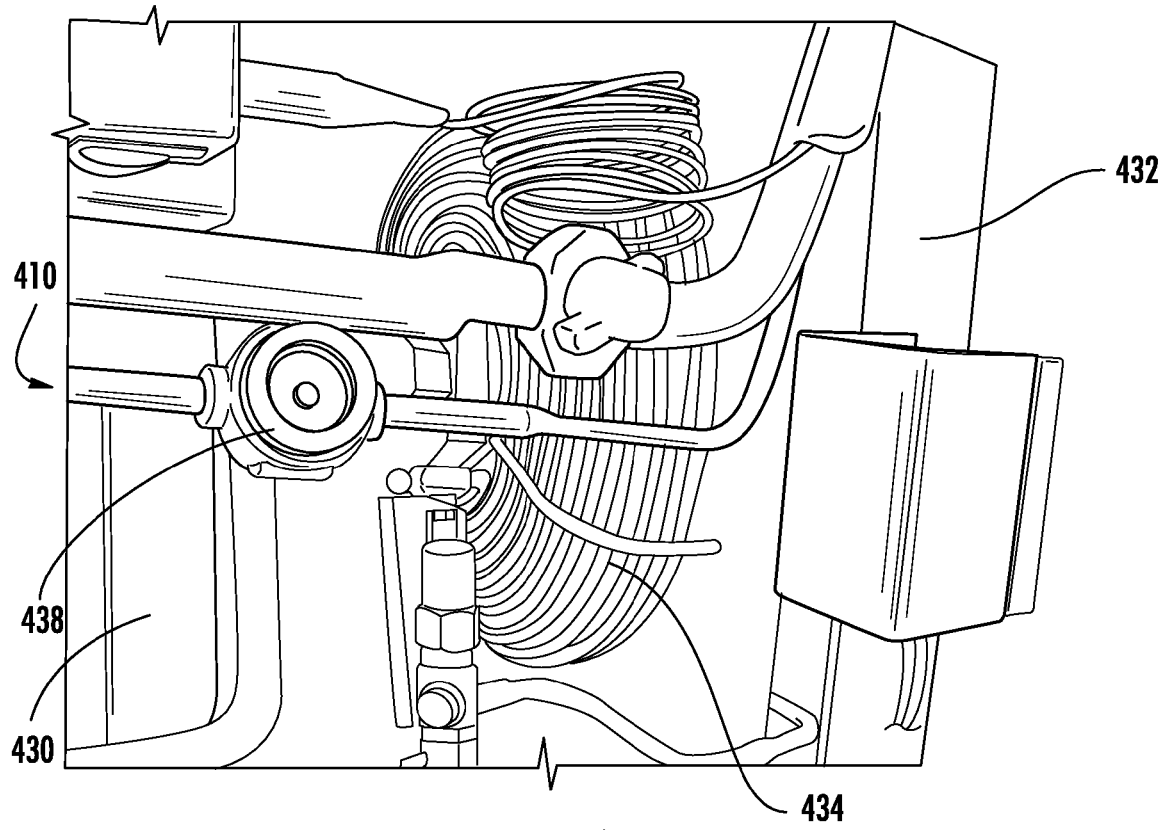

Referring to FIGS. 9-10 the working elements of the cooling system may also include a contaminant removal system (e.g., dryer). In some such embodiments, the contaminant removal system monitors the presence and/or magnitude of contaminants in the refrigerant, and removes the contaminants when needed. In other such embodiments, the contaminant removal system constantly runs when the cooling system is running, potentially removing contaminants without regard to the state of contamination. Such contaminants may include water trapped in the cooling system, which may be dried from the cooling system by the contaminant removal system. In some such embodiments, a display 438 (e.g., sight glass) may be viewed to visually inspect the state of contamination and/or verify the absence of contamination.

Figure 11:
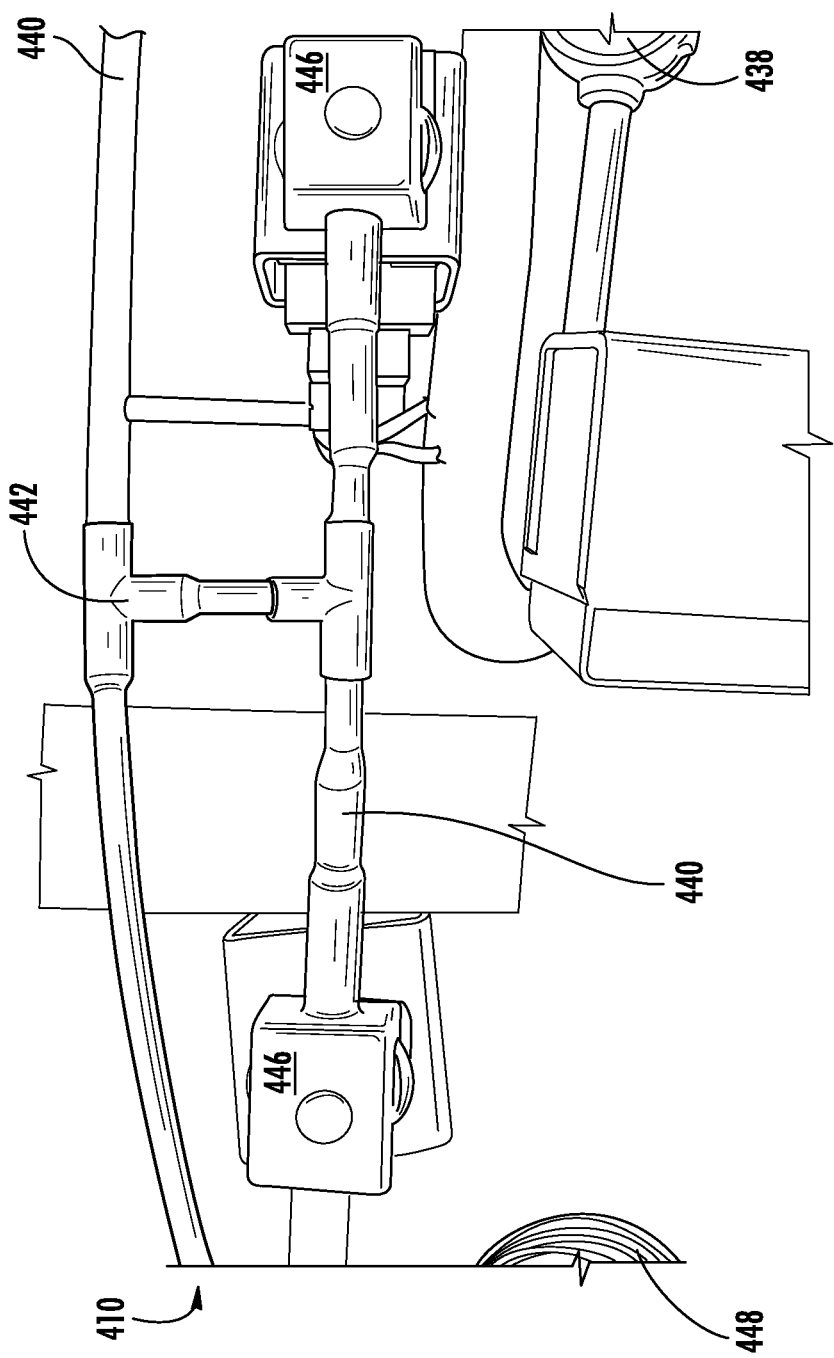
FIGS. 11-17 are perspective views of plumbing and valves associated with the serving station of FIG. 4.

Referring to FIG. 11, plumbing 440 (e.g., pipe, conduit, etc.) associated with the cooling system extends between, to, and from the compressor 430 and condenser 432 in a circuit. The plumbing 440 includes one or more junctures 442 (e.g., T-junctures), allowing refrigerant from an inlet manifold 444 of the plumbing 440 to flow to individual wells 414. When the cooling system of a particular well 414 is activated, refrigerant from the condenser 432 is piped to the respective well 414.

A valve 446 (e.g., sleeve valve, plug valve, poppet, etc.) coupled to the plumbing 440, opens to allow the refrigerant to flow to the well 414, such as through a conduit or conduits wrapping around the side walls of the well 414 (see, e.g., FIG. 20). In some embodiments, the valve 446 is actuated by a solenoid (e.g., linear actuator), which may be remotely controlled by the control interface 416. In other embodiments, the valve 446 is manually and/or otherwise actuated.

Referring to FIGS. 12-17 the plumbing 440 extends from the condenser 432 and is individually connected to each of the wells 414. When controlled to do so, one or more of the valves 446 are opened along the manifold 444, and the refrigerant flows through the valve 446 to a restrictor 448. In some embodiments, the restrictor 448 includes a narrower-gauge pipe. In other embodiments, a restrictor may include a crimp or change in cross section of the pipe, a flow-rate control valve, or another device for adding pressure to the refrigerant fluid flowing therethrough.

Exiting the restrictor 448, the pressure of the refrigerant rapidly drops, lowering the temperature of the refrigerant. Insulation 450 may be used as a thermal barrier surrounding the plumbing 440, as the refrigerant passes to an evaporator (see, e.g., evaporator 520 as shown in FIG. 20) associated with the respective well 414. In some embodiments, the evaporator includes one or more conduits that wrap around the well 414, within or behind thermally conductive walls of the well 414.

Within the well 414, heat is transferred into the refrigerant, cooling the well 414. The rate of heat transfer may be controllable as a function of the flow rate of refrigerant passing through the evaporator. As such, different flow-rate settings, controlled by the degree to which the valve 446 is opened or by the speed of the compressor, for example, allow for different rates of cooling and temperature settings for the well 414. Following passage through the evaporator, the refrigerant is returned via the plumbing 440 to the compressor 430 by way of an outlet manifold 452.

According to an exemplary embodiment, each well 414 of the serving station 410 also includes a heating system. In some embodiments, the heating system uses an electric-resistance heating element (see, e.g., heating element 522 as shown in FIG. 20) to heat a body of water stored in the well 414. The water may be added to the well 414 manually (e.g., with a pitcher), or by way of an automatic filling system. When activated, the heating element heats the water, which produces steam that carries and transfers heat to a food pan (see, e.g., food pan 120 as shown in FIG. 1) resting in the well 414. The rate of heating is controllable by increasing or decreasing the power supplied to the heating element.

When the cooling system is activated following use of the heating system in a particular well 414, heated water previously used by the heating system may first be drained from the well 414. Access to a drainage pipe 454 may be automatically controlled by a solenoid valve 456. To drain the water, the valve 456 opens (e.g., manually, automatically, via commands from the control interface 416, etc.) and gravity pulls the water through the drainage pipe 454 to a drain manifold 458. The water then flows through the drain manifold 458 to an outlet 460 (see FIG. 17) of the serving station 410, and may thereafter be discarded.

Referring now to FIG. 18, a controller for the serving station includes a housing 462 and the control interface 416. According to an exemplary embodiment, the control interface 416 includes a three-way toggle 464 associated with each of the wells 414. With the toggle 464 in a first position, the cooling system is activated. With the toggle 464 in a second position, the heating system is activated. And, with the toggle 464 in a third position neither the cooling system nor the heating system is activated. The control interface 416 further includes an on/off switch 470 for controlling power to the serving station 410.

Indicator lights 466 positioned above and below each toggle 464 denote the position of the toggle 464, and correspondingly which of the heating and cooling systems is activated/deactivated. A thermostat dial 468 may be used to control the intensity of either the heating system or the cooling system. According to an exemplary embodiment however, the dial 468 is only associated with the heating system, and the cooling system is configured to operate at only one setting (i.e., on or off). In other embodiments, the controller is separate from the serving station 410, and configured to be remotely operated (e.g., via radio frequency communication or over the internet).

Within the housing of the controller, the controller includes circuitry 472 (e.g., a computer, programmable logic controller, etc.). A processor 474 of the circuitry 472 may use logic 476 stored in memory 478 associated with the circuitry 472 to control components of the serving station 410, such as the valves 446, 456, the compressor 430, the fan 434 of the condenser 432, electricity to the heating elements (see, e.g., heating elements 314 as shown in FIG. 3), and other features.

The circuitry 472 may be coupled to sensors (e.g., pressure-sensitive member 436, thermo-sensors, load cells, etc.), which may provide data used by the logic 476 when processed by the processor 474. In some embodiments, a timer 480 may be coupled to the sensors. Default and/or override commands may be incorporated in the logic 476, which operate the components for purposes of energy efficiency (e.g., automatic timed shut-off of the compressor 430), safety, or other purposes. In at least one embodiment, the timer 480 may be used to down-cycle the compressor 430 following deactivation of the cooling system.

Figure 19:
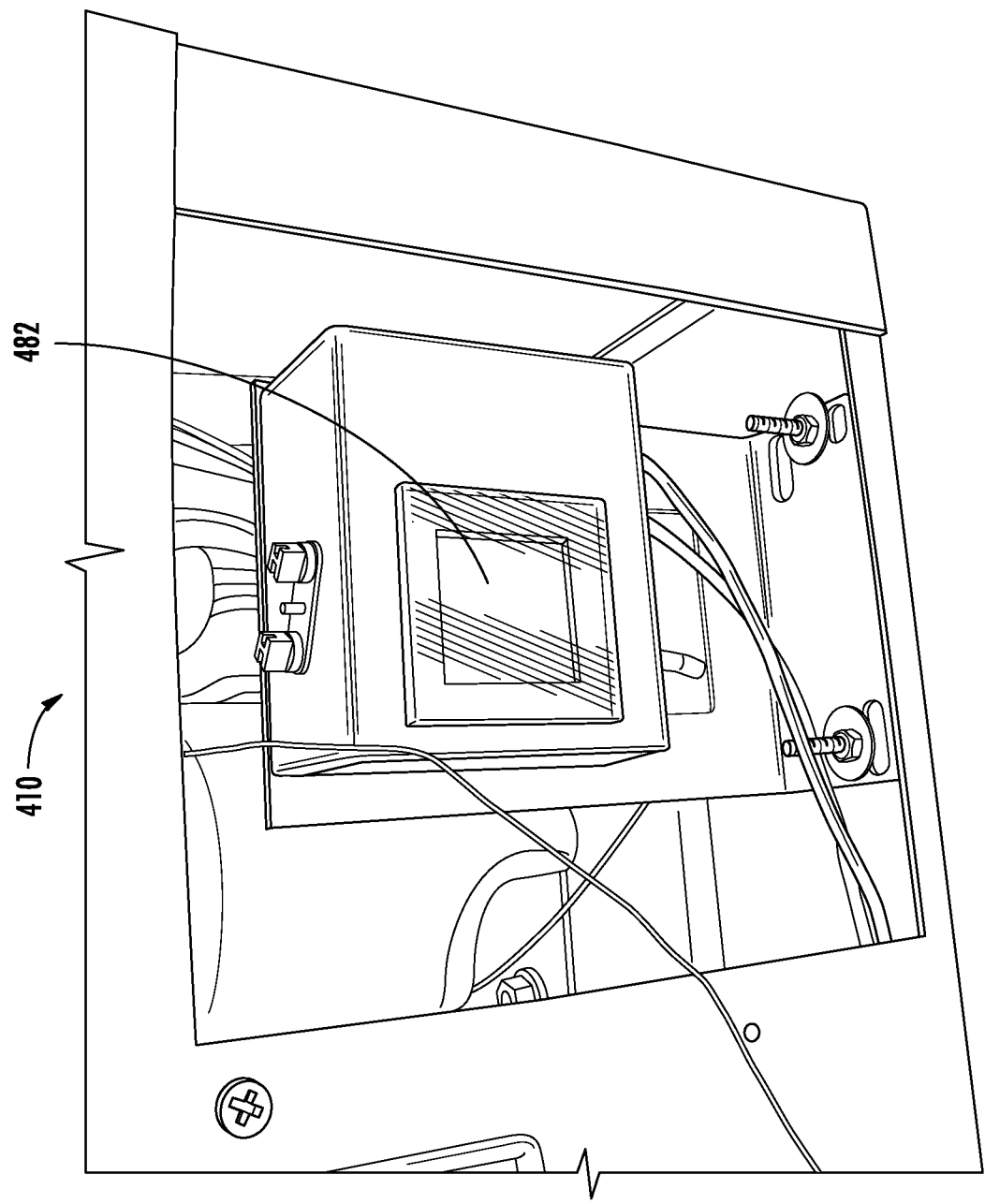
FIG. 19 is a perspective view of a display associated with the serving station of FIG. 4.

Referring to FIG. 19, in some embodiments, a visual screen display 482 may be associated with the serving station 410. In some such embodiments, the visual screen display 482 provides information related to the temperatures of the wells 414, such as the current temperature and the set temperature. In other embodiments, the visual screen display 482 may provide information related to whether the wells 414 are currently holding water, and the current volume of water in a particular well 414. In contemplated embodiments, the visual screen display 482 is capable of touch-screen command inputs and may be used in conjunction with or in place of the control interface 416.

Referring now to FIG. 20, a well 510 includes upper side walls 512, an upper level 514, lower side walls 516, and a lower level 518. According to an exemplary embodiment, the upper level 514 is configured to support the rim of one or more food pans (see, e.g., food pan 120 as shown in FIG. 1), where the underside of the food pan is positioned within the well 414, surrounded by the lower side walls 516 and lower level 518. An evaporator 520 extends around the upper side walls 516 and the lower side walls 518. As such, a blanket (e.g., layer, curtain) of cooled air is provided over the food pan, during use of the cooling system. A heating element 522 is coupled to the lower level 518 of the well 510. During use of the heating system, water is provided in the well 510, which is heated by the heating element 522, producing steam that heats the food pan.

Referring to FIGS. 21-24 a food station 610 includes five wells 612, a cooling system 614, heating elements 616, and a control panel 618. The control panel 618 includes interfaces 620 associated with each of the wells 612 that may be used to operate valves (see, e.g., valves 446 as shown in FIG. 11) associated with each of the wells 612 for cooling, and to control electricity supplied to the heating elements 616 in each of the wells 612 for heating. Drains 624 (FIG. 22) in each of the wells 612 are coupled valves 622 (FIG. 23) that may permit draining of heated water through the plumbing 626.

According to an exemplary embodiment, each of the wells 612 includes an upper vertical wall 628 above a horizontal ledge 630, which is above a lower vertical wall 632 and floor 634 of the well 612. The rim of a food pan (see, e.g., food pan 120 as shown in FIG. 1) may be supported by the ledge 630, below the upper vertical wall 628. Vents 636, 638 in the upper and lower vertical walls 628, 632 may provide cooled air to the contents of the food pan. The vents 628 of the upper vertical walls 628 facilitate formation of a blanket of cool air between the upper vertical walls 628 and over the food tray.

Each of the wells 612 may be independently operated (e.g., hot or cold regardless of temperatures other wells), allowing for side-by-side serving and storing of contents best held to different temperatures (e.g., vanilla ice cream in a well adjoining a well holding melted fudge). Use of a common control panel 618 and cooling system 614, in some embodiments, saves space and resources, allowing for a compact food-line arrangement or catering area.

At the end of a serving session, the cooling system of a well that had been heated may be actuated to cool foods typically served hot (e.g., burger patties, gravy) for storage. In some embodiments, operation of the cooling system automatically activates the valve 622 to release heated water from the well 612 through the drain 624, reducing time and energy needed to cool the well 612 and contents thereof.

Figure 25:
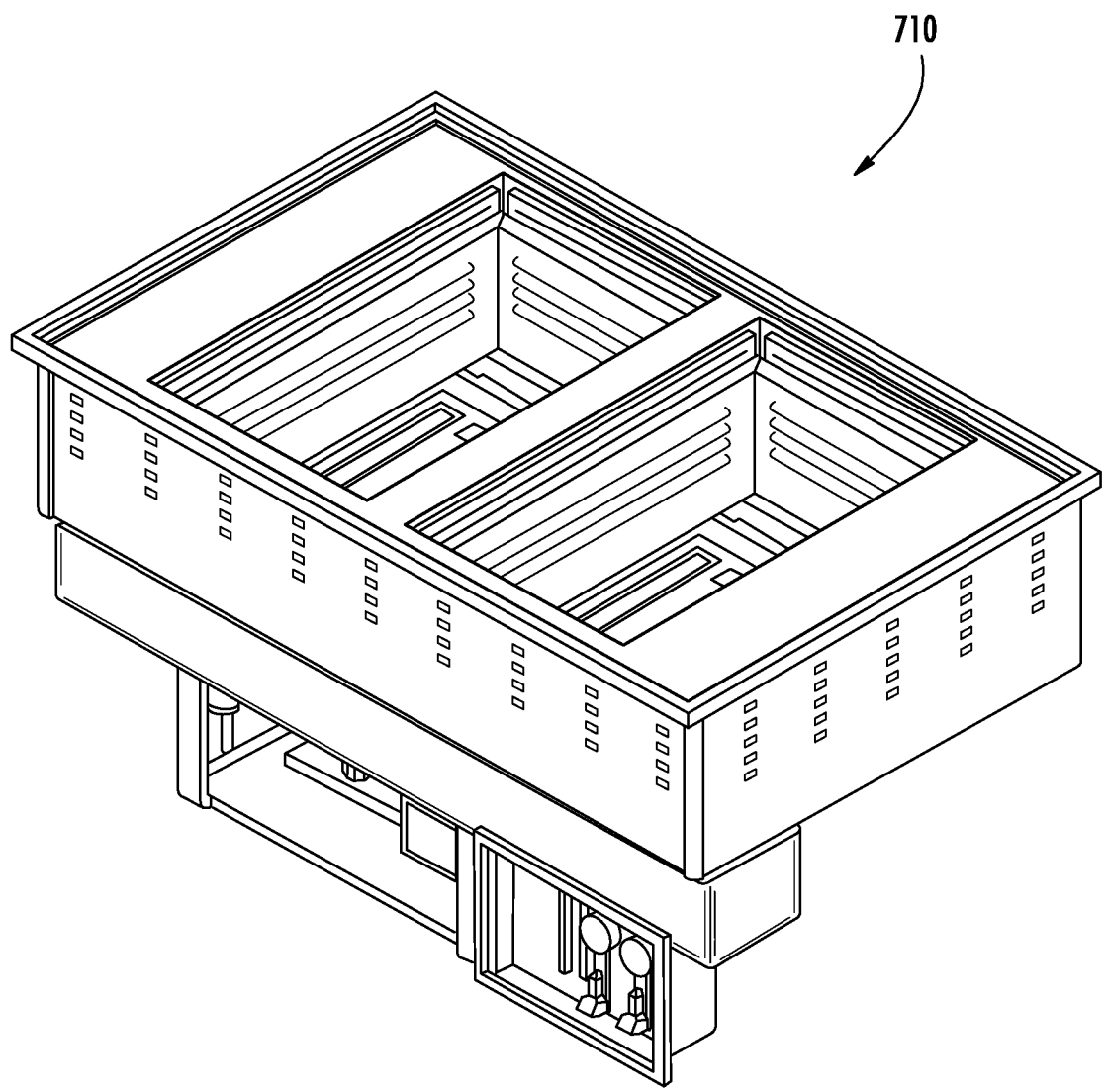
FIG. 25 is a perspective view of a food station according to another exemplary embodiment.

Referring now to FIG. 25, a food station 710 including two wells 612 includes features similar to those of the food station 610 as shown in FIGS. 21-24. In other embodiments, food stations include still other numbers of wells 612. Some features and innovations disclosed herein may be embodied in the "Hot/Cold Top and Bottom Mount Wells" product manufactured by The Vollrath Company, LLC.

The construction and arrangements of the serving station, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, in some contemplated embodiments, the heating and cooling systems may be simultaneously or sequentially run by the controller, to maintain the temperature of a well within a predetermined narrow temperature range. In other contemplated embodiments, operation of a single dial controller associated with a particular well (see, e.g., FIG. 2) directs the activation and set temperature for both the heating and cooling systems, as well as turns both systems on or off. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A serving station, comprising:
   a first well and a second well, the wells configured for receiving food pans, wherein each well comprises:
   a bottom of the well;
   a lower wall extending upward from the bottom;
   an upper wall; and
   a ledge between the lower and upper walls, wherein a food pan may be at least partially inserted into a lower volume defined by the lower wall and bottom, with a rim of the food pan supported by the ledge;
   an active cooling system configured to independently lower the temperature of either or both of the first and second wells, wherein the cooling system comprises:
   a compressor;
   a condenser;
   a first evaporator associated with the first well and a second evaporator associated with the second well;
   a first solenoid valve associated with the first evaporator and a second solenoid valve associated with the second evaporator, wherein when the first or second valve is open, refrigerant is supplied to the corresponding first or second evaporator during operation of the cooling system; and
   a pressure sensor in communication with the compressor and configured to detect refrigerant pressure, wherein the compressor is actuated when the pressure sensor detects a low refrigerant pressure and is deactivated when the pressure sensor detects a high refrigerant pressure;

an active heating system configured to independently raise the temperature of either or both of the first and second wells;
wherein both wells may be heated, both wells may be cooled, or one of the first and second wells may be heated while the other is cooled; and
wherein the cooling system is configured to cool the upper wall of each well and thereby provide a blanket of cooled air over the food pan; and
a drain system coupled to the wells, wherein the drain system comprises a first drainage valve and a first drainage pipe associated with the first well, a second drainage valve and a second drainage pipe associated with the second well, and a drain manifold; and
a controller coupled to the drain system that opens the drainage valve associated with the well which the cooling system is activated to lower the temperature, allowing the water to drain from the well through the drainage pipe associated with the well to the drain manifold.

2. The serving station of claim 1, wherein each of the first and second evaporators is integrated with the upper wall of the associated well.

3. The serving station of claim 2, wherein each of the first and second evaporators extends around the upper wall of the associated well.

4. The serving station of claim 3, wherein each of the first and second evaporators comprise coils adjacent to the upper and lower walls of the associated well.

5. The serving station of claim 1, wherein the compressor has an inlet and an outlet, and wherein the pressure sensor is positioned proximate to the inlet of the compressor.

6. The serving station of claim 1, further comprising:
a manifold conduit extending from the condenser and coupled to each of the first and second solenoid valves; and
a first restrictor associated with the first solenoid valve and a second restrictor associated with the second solenoid valve.

7. The serving station of claim 6, wherein each of the first and second restrictors comprises a capillary conduit having a lesser cross-sectional area than the manifold conduit.

8. The serving station of claim 1, wherein the heating system comprises:
a first heating element coupled to the bottom of the first well and a second heating element coupled to the bottom of the second well; and
a first switch associated with the first heating element and a second switch associated with the second heating element, wherein when each of the first and second switch is closed, electricity is supplied to the corresponding first or second heating element during operation of the serving station.

9. The serving station of claim 8, wherein the controller is further configured to operate either or both of the first and second switches and to operate either or both of the first and second solenoid valves.

10. The serving station of claim 9, wherein the controller comprises a first three-way toggle associated with the first well and a second three-way toggle associated with the second well, and each three-way toggle having a first setting to activate the cooling system, a second setting to activate the heating system, and a third setting in which neither the cooling system nor the heating system is activated.

11. The serving station of claim 9, wherein the controller comprises a thermostat associated with each of the heating elements.

12. The serving station of claim 11, wherein the thermostat is controlled by a rotatable dial.

13. A serving station, comprising:
a well configured for receiving a food pan;
an active heating system configured to raise the temperature of the well, wherein the active heating system comprises a heating element configured to operate at least partially submerged in water so that steam from the water heats the food pan;
an active cooling system configured to lower the temperature of the well, wherein the well may be heated or cooled; and
a drain system coupled to the well, wherein the drain system comprises a drainage valve and a drainage pipe; and
a controller coupled to the drain system, the controller automatically releases the drainage valve when the cooling system is activated, allowing for the water to drain from the well through the drainage pipe.

14. The serving station of claim 13, wherein the cooling system comprises:
a compressor having an inlet and an outlet;
a condenser;
an evaporator associated with the well;
a valve associated with the evaporator, wherein when the valve is open, refrigerant is supplied to the evaporator to cool the well; and
a pressure sensor positioned proximate to the inlet of the compressor and configured to detect refrigerant pressure, wherein the controller is configured to actuate the compressor when the pressure sensor detects a low refrigerant pressure and the controller is configured to deactivate the compressor when the pressure sensor detects a high refrigerant pressure.

15. The serving station of claim 13, wherein the well comprises:
a bottom;
a lower wall extending upward from the bottom;
an upper wall; and
a ledge between the lower and upper walls, wherein a food pan may be at least partially inserted into a lower volume defined by the lower wall and bottom, with a rim of the food pan supported by the ledge, and wherein the cooling system is configured to cool the upper wall of the well and thereby provide a blanket of cooled air over the food pan.

16. The serving station of claim 1, wherein the controller is further configured to proportionally control a speed of the compressor as a function of the refrigerant pressure detected by the pressure sensor.

* * * * *